No. 722,391.　　　　　　　　　　　　　　　　　　PATENTED MAR. 10, 1903.
T. D. TAYLOR.
DEPOSIT CREDIT BOOK.
APPLICATION FILED SEPT. 9, 1901.

NO MODEL.　　　　　　　　　　　　　　　　　　　　2 SHEETS—SHEET 1.

FIG. 1.

WITNESSES.　　　　　　　　　　　　　　INVENTOR.
Charles T. Hannigan　　　　　　　　Thomas D. Taylor
Henry M. Boss Jr　　　　　　　　　　By Horatio E. Bellows
　　　　　　　　　　　　　　　　　　　　　　Atty.

No. 722,391.  
T. D. TAYLOR.  
DEPOSIT CREDIT BOOK.  
APPLICATION FILED SEPT. 9, 1901.  
PATENTED MAR. 10, 1903.

NO MODEL.  
2 SHEETS—SHEET 2.

FIG. 2.

$------  Boston, Mass. ----- 190__

THE DEPARTMENT STORE BANK,  
BRANCH OF THE _____ TRUST COMPANY.

Deliver to _____ or bearer  
_____ Dollars,  
IN MERCHANDISE. CHARGE THIS AMOUNT ON MY BANK BOOK, WHICH IS PRESENTED HEREWITH FOR THIS PURPOSE, AS A CONTINGENT WITHDRAWAL. IF I DO NOT PAY _____ THIS AMOUNT WITHIN _____ DAYS, DEDUCT IT PERMANENTLY FROM MY CASH BALANCE IN YOUR BANK. INTEREST, ACCORDING TO YOUR RULES, IS TO BE ALLOWED ME DURING THE ____ DAYS.

(Left margin: THIS MERCHANDISE VOUCHER WILL NOT BE HONORED UNLESS ACCOMPANIED BY BANK BOOK.)

FIG. 3.

$------  Boston, Mass. ----- 190__

THE DEPARTMENT STORE BANK,  
BRANCH OF THE _____ TRUST COMPANY.

Pay to _____ or order; $ ____  
_____ Dollars,  
OUT OF NET BALANCE DUE ME, ACCORDING TO MY BANK BOOK, WHICH IS PRESENTED HEREWITH.

CERTIFICATION.  
THIS CHECK WILL BE HONORED, ON DEMAND, WHEN PROPERLY ENDORSED BY PERSON TO WHOM IT IS MADE PAYABLE.

(Left margin: CERTIFIED CHECK. BRING YOUR BOOK AND HAVE THIS CERTIFIED FOR PAYMENT, AND IT CAN THEN BE USED, LIKE ANY NEGOTIABLE BANK CHECK, FOR ANY PURPOSE YOU MAY DESIRE, PAYMENT BEING GUARANTEED.)

FIG. 4.

$------  Boston, Mass. ----- 190__

THE DEPARTMENT STORE BANK,  
BRANCH OF THE _____ TRUST COMPANY.

Pay to _____ or bearer, $ ____  
_____ Dollars,  
OUT OF NET BALANCE DUE ME, ACCORDING TO MY BANK BOOK, WHICH IS PRESENTED HEREWITH.

(Left margin: THIS CASH VOUCHER WILL NOT BE HONORED UNLESS ACCOMPANIED BY BANK BOOK.)

WITNESSES.  
Charles T. Hannigan  
Henry M. Bos Jr.

INVENTOR.  
Thomas D. Taylor  
By Horatio E. Bellows  
Atty.

UNITED STATES PATENT OFFICE.

THOMAS D. TAYLOR, OF CRANSTON, RHODE ISLAND.

DEPOSIT-CREDIT BOOK.

SPECIFICATION forming part of Letters Patent No. 722,391, dated March 10, 1903.

Application filed September 9, 1901. Serial No. 74,858. (No model.)

*To all whom it may concern:*

Be it known that I, THOMAS D. TAYLOR, a citizen of the United States, residing at Cranston, in the county of Providence and State of Rhode Island, have invented certain new and useful Improvements in Deposit-Credit Books, of which the following is a specification.

My invention relates to books employed to secure safety in commercial transactions, and has for its purpose the utilization of a bank-account or other credit balance to secure credit for an equal or lesser sum in merchandise elsewhere than at the place of deposit without withdrawing in the first instance any part of the bank-account and without interrupting the accumulation of interest upon the balance. A book adapted to this end has been described in a Patent No. 692,384, issued to me February 4, 1902, and my present invention relates to certain novel features supplementary and auxiliary thereto.

In the drawings, wherein like letters of reference indicate like parts throughout the views, Figure 1 is a face view of my merchandise deposit-book; Fig. 2, a like view of my merchandise-voucher; Figs. 3 and 4, similar views of the certified check and cash-voucher, respectively.

In Fig. 1 is displayed the ordinary savings-bank-deposit book combined with a merchandise-account lettered, respectively, A and B. In this case the acting bank is a "department-store bank," so called—that is, an officer of some bank or trust company is stationed in the department-store adopting this system and guarantees the deposits with the department-store on behalf of the bank represented. Page A has the usual savings-bank heading, with added columns $a$ and $b$, the former for the signature of the bank representative who guarantees the deposit and the latter showing the net balance available for credit after deduction from cash balance $c$ of balance due stores $d$. Page B is a record of purchases made by the depositor from the department-store or other creditor containing a "merchandise account," which includes columns for the date of credit purchase $c$, amount of purchase $f$, time of credit $g$, and record of payments $h$. A column $i$ shows the individual receiving payment on behalf of the store or creditor, and column $d$ indicates the total amount of credit at any time which the depositor is receiving.

A convenient way of utilizing the book above described was outlined in my aforesaid previous patent. The depositor or holder of the book showing an entry in column $c$ presents the same to a merchant from whom he desires to purchase an article, who enters the date of the credit purchase, amount of same, and days of credit under the appropriate heads in columns $e$, $f$, $g$, and $d$. If or when any amount charged in the merchandise account is paid entry of such amount is made in column $h$, party receiving payment in column $i$, and said amount is deducted from amount in column $d$. The excess of the footing of column $c$ over column $d$ at any stated time may be entered in column $b$, which always shows the amount of credit with which the depositor can trade. As shown in my previous patent, this book may be modified when it is desired to trade with more than one merchant.

This invention has thus far been discussed upon the basis of a presentation of the bank-deposit book alone; but the following supplementary or auxiliary features facilitate the use exceedingly: The merchandise-voucher (shown in Fig. 2) is a slip signed by the depositor and submitted, together with the deposit-book, to the bank or merchant ordering a given amount of merchandise on a stipulated period of credit as a contingent withdrawal. It is true of this form, as of those hereinafter enumerated, that thereby the depositor may obtain credit without personal appearance.

Referring now to certified-check slip, (shown in Fig. 3,) it need only be remarked that its negotiable form after certification is such as to enable the depositor who signs the same to employ it as would any national-bank depositor.

The cash-voucher, Fig. 4, as its name implies, is employed in cash transactions and is a convenient proof to the bank of payment to the depositor.

The use of my invention, as hereinabove elaborated, has been based upon the existence of a deposit-book; but the inventor does not desire to limit himself to this expression of his principle.

Having thus described my invention, what I claim as new, and desire to secure by Letters Patent, is—

A deposit-credit book comprising separate oppositely arranged and facing pages, one of which constitutes a deposit-sheet and is provided with appropriately-headed spaces for data relating to deposits, one of said spaces being for entries of the cash balance and another for the available or net balance; the other of said pages constituting an account-sheet provided with appropriately-headed spaces for data relating to commercial transactions other than those with the bank, one of said spaces being for the credits received by the customer in such transactions, and a series of negotiable vouchers, said vouchers having thereon spaces for orders to be filled out and also having printed thereon in the body of the order the words "cash balance" or "net balance" according to the corresponding cash-balance and net-balance spaces of the deposit-sheet to which the order refers, said vouchers also having printed thereon coupon portions containing notice to the holder to accompany the voucher with the said credit-book.

In testimony whereof I have affixed my signature in presence of two witnesses.

THOMAS D. TAYLOR.

Witnesses:
MAE E. BELLOWS,
HORATIO E. BELLOWS.